C. L. NEWLAND.
DEVICE FOR DRAWING OFF MEASURED QUANTITIES OF LIQUIDS.
APPLICATION FILED DEC. 11, 1909.

963,633.

Patented July 5, 1910.

2 SHEETS—SHEET 1.

Witnesses

Charles L. Newland, Inventor.

C. L. NEWLAND.
DEVICE FOR DRAWING OFF MEASURED QUANTITIES OF LIQUIDS.
APPLICATION FILED DEC. 11, 1909.
963,633.
Patented July 5, 1910.
2 SHEETS—SHEET 2.
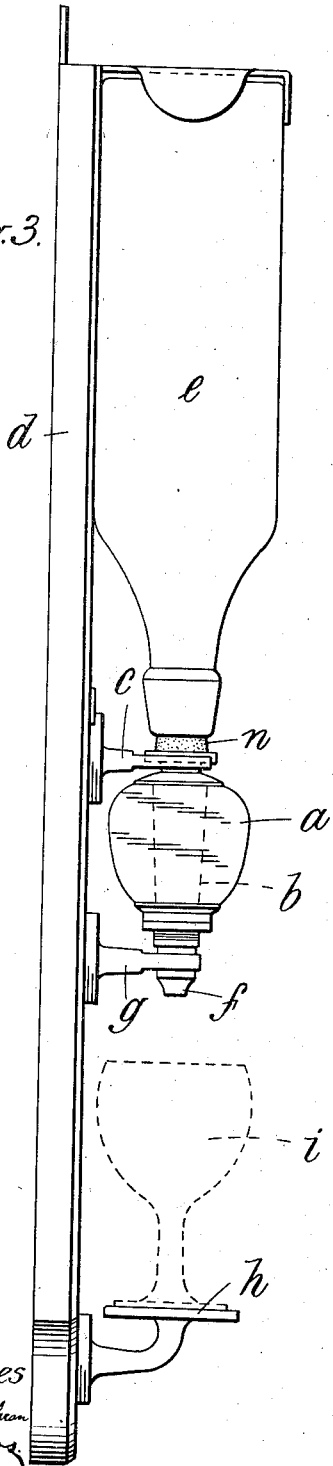
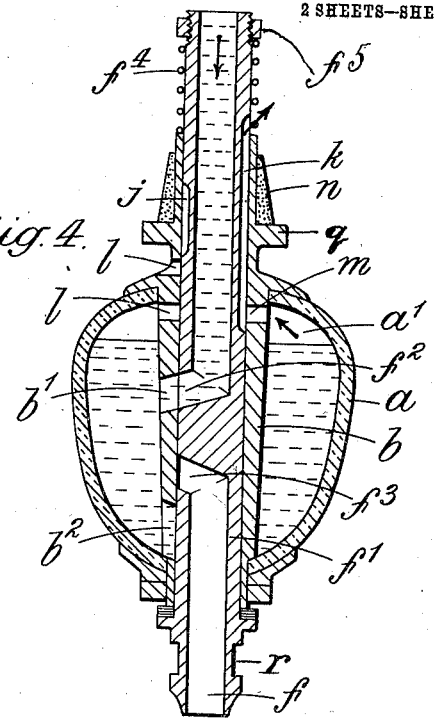
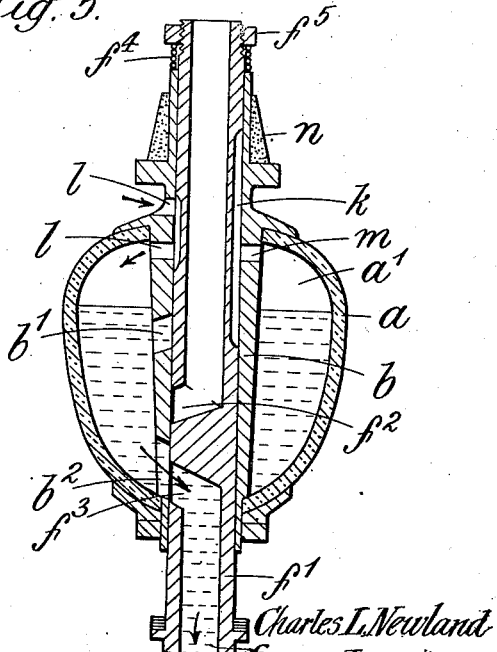
Charles L. Newland
Inventor.

UNITED STATES PATENT OFFICE.

CHARLES LESLIE NEWLAND, OF MERTON, ENGLAND.

DEVICE FOR DRAWING OFF MEASURED QUANTITIES OF LIQUIDS.

963,633.   Specification of Letters Patent.   Patented July 5, 1910.

Application filed December 11, 1909. Serial No. 532,698.

*To all whom it may concern:*

Be it known that I, CHARLES LESLIE NEWLAND, a subject of His Majesty the King of England, residing at Victoria Villa, Cavendish Road, Merton, in the county of Surrey, Kingdom of England, engineer, have invented certain new and useful Improvements in and Relating to Devices for Drawing Off Measured Quantities of Liquids, of which the following is a specification.

This invention relates to devices for drawing off measured quantities of liquid from bottles or other vessels of the kind wherein the liquid is conducted into a measuring chamber that is provided with inlet and outlet valves that are operated upon the sliding movement of a feed tube that is operatively connected with a movable platform on which the receiving receptacle is placed.

The invention consists in the improved arrangement of the valves whereby the quantity of liquid to be discharged can be regulated for the same measuring chamber by limiting the movement of the feed tube; in the arrangement of the air passages whereby the air inlet to the chamber and the air passage from the chamber to the main supply vessel are controlled by the sliding feed tube; and also in the combination with such devices of registering means adapted to indicate the number of operations of the valve.

Figure 1:
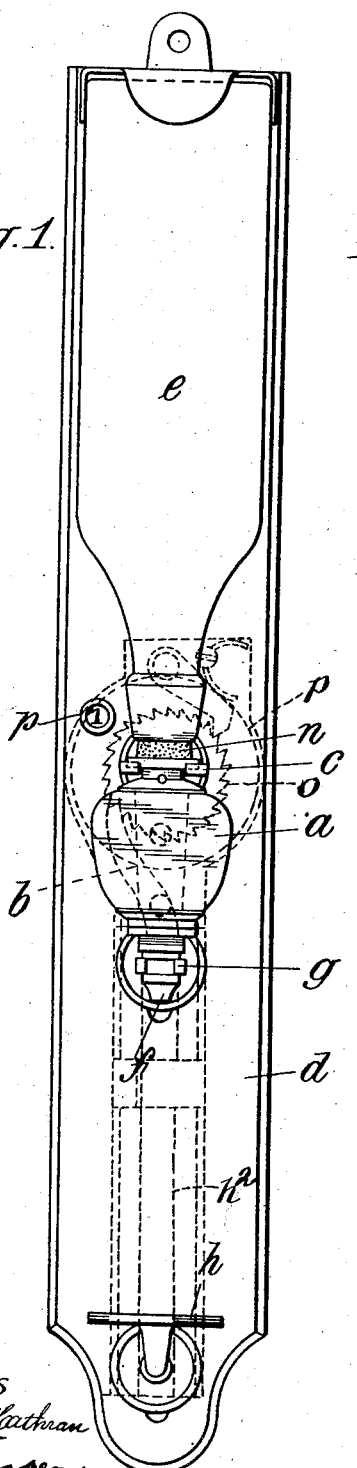
Figure 2:
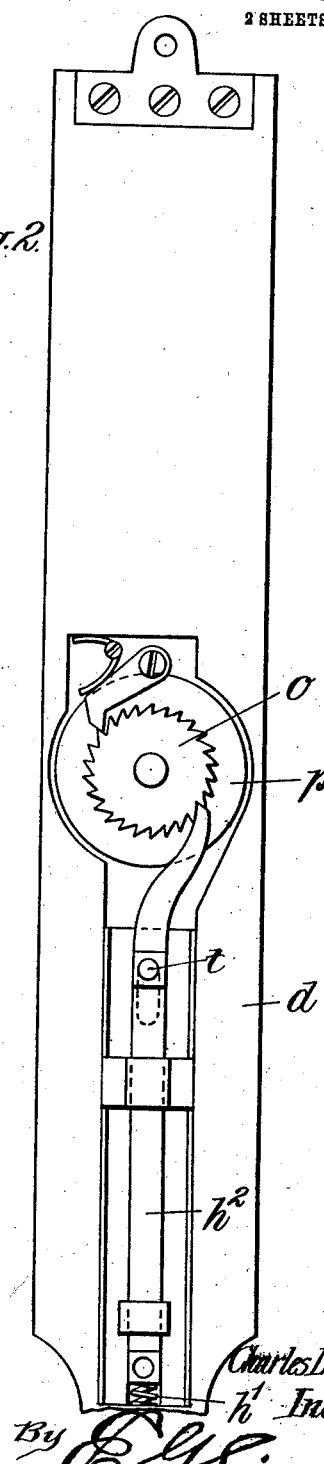

In the accompanying drawings with reference to which I will now describe my invention:—Figure 1 is a front elevation of my improved device; Fig. 2 is a back elevation; Fig. 3 is a side elevation; Fig. 4 is a detail sectional elevation of the bulb in its normal position and when being filled from the main supply. Fig. 5 is a similar view to Fig. 4 showing the valve open and the liquid partly discharged from the bulb.

In carrying out the present invention as applied to a drawing off device for use in public houses for delivering measured quantities of whisky or other liquids I mount the liquid measuring device or bulb $a$, which is preferably made of glass or other transparent material around a metal tube or sleeve $b$ supported by an arm or bracket $c$ projecting from the wall bracket or plate $d$ and engaging an annular flange $q$ near the upper end of the tube. The bulb is connected closely with the tube at its upper and lower joints so as to form a sealed chamber $a^1$ which is adapted to be put into communication with the main container which is in this case an inverted bottle $e$ when it has to be filled, or connected with an axially bored outlet orifice $f$ when it has to be emptied.

For controlling the supply of liquid to and its exit from the bulb $a$ an internally bored sliding sleeve or tube $f^1$ is arranged within the first mentioned tube $b$ and this tube or sleeve is provided with inlet and outlet port holes or notches $f^2$, $f^3$ respectively which are adapted to register with a plurality of like inlet and outlet holes or ports $b^1$ $b^2$ in the outer tube $b$ according to its position.

The lower end of the inner sleeve or tube $f^1$ is provided with an annular groove $r$ which is engaged by an arm or bracket $g$ connected, as, for instance, by a rod or like member $h^2$, with a preferably spring-controlled forwardly projecting table or stand $h$ upon which the glasses are placed. By such an arrangement is provided a movable support so that when a glass $i$ (shown by dotted lines) is placed in position, either by its own weight or by slight additional pressure applied while the operator is holding the glass, the inner sleeve $f^1$ will be pulled down under the influence of the bracket $g$, the table $h$, and the connection between the same until its outlet port $f^3$ registers with the outlet port $b^2$ in the outer sleeve $b$ so allowing the liquid to flow out from the bulb $a$ down the lower part of the central bore of the inner tube $f^1$ to the orifice $f$ as shown in Fig. 5. As soon as the glass $i$ is removed the rod $h^2$ rises under the influence of the spring $h^1$ and acts through the bracket $g$ to return the tube or sleeve $f^1$ to its normal position (Fig. 4) and the port $f^2$ in the said sleeve $f^1$ then puts the interior $a^1$ of the bulb $a$ into communication through the port $b^1$ of the outer tube $b$ with the main volume of liquid whereupon the bulb or measuring chamber will automatically re-fill.

It will be obvious that in order that the liquid may flow out of and into the bulb it is necessary to put the interior $a^1$ of the bulb $a$ into communication with the atmosphere and also with the interior of the main receptacle and for this purpose two longitudinal grooves $j$ $k$ are cut along the outer surface of the inner sliding sleeve $f^1$. These grooves are so positioned that when the sleeve $f^1$ is pulled down the groove $j$ connects two ports $l$ $l$ in the outer tube one opening to the atmosphere and the other to the measuring bulb to admit air to the bulb to take the place of the outgoing liquid. The groove $k$ when the sleeve $f^1$ is raised or in its normal position (Fig. 4), that is when the bulb is being filled from the main receptacle $e$, connects another port $m$, in the outer tube and opening into the bulb, with the main container $c$ so that as the liquid enters by the main ports $f^2$ $b^1$ to fill the measuring bulb $a$ the air from the bulb escapes up the groove $k$ and bubbles up through the liquid in the main receptacle. An additional spring $f^4$ is provided around the upper end of the sleeve $f^1$ to assist in its return movement.

It will be seen that by regulating or limiting the downward movement of the inner sleeve $f^1$, as, for instance, by a lock ring $f^5$, the lower port $f^3$ can be prevented from entirely emptying the chamber $a^1$.

Any convenient attachment can, of course, be provided on the upper end of the outer sleeve $b$, for instance, as shown, a cork ring $n$ could be placed therearound for attachment to the bottle which can then be inverted as shown to empty its contents in measured quantities as desired. The device could also be made in large sizes for say measuring off motor spirit or petroleum in gallons or like quantities.

Where the device is employed for use in public houses a suitable registering device such as a ratchet wheel $o$ can be conveniently provided behind the wall plate and engaged by a finger $s$ on the upper end of the rod $h^2$ so that it will be turned one tooth by each operation of the device to tally by means of an index disk $p$ the number of drinks or the like drawn off, the numeral on the disk being viewed through a suitable opening in the wall plate. This arrangement would be very convenient for stocktaking or other checking purposes. It will be understood, of course, that the finger $s$ is pivotally attached to the upper end of the slide $h^1$, as shown at $t$ in Fig. 2, so as to follow the movement of the ratchet wheel.

What I claim and desire to secure by Letters Patent of the United States is:—

1. A device for drawing measured quantities of liquids comprising, in combination, a container, a sealed measuring chamber, a tube secured within the chamber and provided with inlet and outlet ports, a tube slidably fitted within the first-mentioned tube and communicating with the container and provided with inlet and outlet ports arranged to register with the first-mentioned ports, a movable support adapted to hold a receptacle and connected with the slidable tube, whereby the outlet ports of the tubes may be caused to register to discharge the contents of the measuring chamber, and means for moving the slidable tube to cause the inlet ports of the two tubes to register to fill the chamber, the tubes being provided with additional ports to admit air to the chamber and permit the same to escape to the container.

2. A device for drawing measured quantities of liquids comprising, in combination, a sealed measuring chamber, a tube extending through said chamber and provided with inlet and outlet ports within the same, an inner tube slidably fitted within the first-mentioned tube and provided with inlet and outlet ports, said inner tube being arranged to communicate with a source of supply, a movable support for a receptacle connected with said inner tube and operating upon the same to cause the outlet port therein to register with the outlet port in the outer tube for the purpose of discharging the contents of the measuring chamber, means for automatically causing the inlet port in said inlet tube to register with the inlet port in the outer tube to put the measuring chamber into communication with the source of supply, the said tubes having additional ports to permit the entry of air to the measuring chamber and the escape of air from the said chamber to the source of supply, and a tally actuated by said support in unison with the slidable tube.

3. A device for drawing measured quantities of liquids comprising, in combination, a sealed measuring chamber, a fixed tube extending through the measuring chamber and provided with inlet and outlet ports within the same, an inner tube slidably fitted within the first-mentioned tube and provided with inlet and outlet ports, a movable support connected with said slidable tube and operating upon the same to cause the outlet ports of the two tubes to register and discharge the contents of the measuring chamber, means for automatically causing the inlet ports of the tubes to register to put the measuring chamber into communication with a source of supply, the tubes being provided with additional ports to permit the entry of air to the measuring chamber and the escape of air therefrom to the source of supply, and means for limiting the downward movement of the inner tube to prevent the complete exit of the contents of the measuring chamber.

4. The combination of a fixed support, a sealed measuring chamber thereon adapted to engage a container, a fixed tube extending through the measuring chamber and provided with inlet and outlet ports within the same and also provided with an inlet port above the measuring chamber and additional ports within the said chamber and near the top of the same, a slidable tube fitted within the first-mentioned tube and provided with inlet and outlet ports adapted to register respectively with the inlet and outlet ports of the fixed tube, the said slidable tube being further provided with grooves adapted to register with the ports in the fixed tube at the upper end of the measuring chamber, a support for a receptacle below the measuring chamber, a connection between the said support and the slidable tube whereby the tube may be actuated by said support to permit the contents of the measuring chamber to escape, and a spring acting on the said tube in opposition to the said support to bring the inlet port of the said tube into registry with the inlet port of the fixed tube whereby the measuring chamber may be filled.

In testimony, that I claim the foregoing as my invention, I have signed my name in presence of two subscribing witnesses.

CHARLES LESLIE NEWLAND.

Witnesses:
    J. S. CORNIER,
    W. CHOWLES.